United States Patent
Nunnikhoven

(10) Patent No.: US 9,428,204 B2
(45) Date of Patent: Aug. 30, 2016

(54) METHOD FOR HANDLING SPACERS USED IN PRODUCING CONCRETE PIPE

(71) Applicant: Hawkeye Concrete Products Co., Mediapolis, IA (US)

(72) Inventor: Steven A. Nunnikhoven, Mediapolis, IA (US)

(73) Assignee: Hawkeye Concrete Products Co., Mediapolis, IA (US)

( * ) Notice: Subject to any disclaimer, the term of this patent is extended or adjusted under 35 U.S.C. 154(b) by 428 days.

(21) Appl. No.: 13/719,849

(22) Filed: Dec. 19, 2012

(65) Prior Publication Data

US 2013/0108410 A1 May 2, 2013

Related U.S. Application Data

(62) Division of application No. 12/721,898, filed on Mar. 11, 2010, now abandoned.

(60) Provisional application No. 61/241,245, filed on Sep. 10, 2009.

(51) Int. Cl.

| | |
|---|---|
| *B62B 1/26* | (2006.01) |
| *B62B 3/04* | (2006.01) |
| *B65G 65/00* | (2006.01) |
| B65G 57/00 | (2006.01) |
| B62B 3/02 | (2006.01) |

(52) U.S. Cl.
CPC ............... *B62B 1/262* (2013.01); *B62B 3/04* (2013.01); *B65G 65/00* (2013.01); *B62B 3/02* (2013.01); *B62B 2202/48* (2013.01); *B62B 2203/02* (2013.01); *B65G 57/005* (2013.01)

(58) Field of Classification Search
CPC ..... B62B 3/02; B62B 2203/02; B62B 1/262; B62B 1/264; B62B 2202/48; A47G 25/10; A47F 5/0006; A47F 5/04; A47F 5/0876; A47F 1/121; A47F 2005/0012; A47F 7/143; E04C 5/166; E04C 5/00; E04C 5/01; E04C 5/12; E04C 5/168; E04C 5/18; B65D 71/00; B65D 83/0088; B65G 57/005; B65G 57/18; B65G 57/186; B65B 5/06; B65B 5/10; B43M 99/009

See application file for complete search history.

(56) References Cited

U.S. PATENT DOCUMENTS

| | | |
|---|---|---|
| 338,288 A | 3/1886 | Normandy |
| 445,633 A | 2/1891 | Becker |
| 1,019,735 A * | 3/1912 | Goodrich ............. B43M 99/009 206/338 |
| 1,038,198 A | 9/1912 | Randall et al. |

(Continued)

FOREIGN PATENT DOCUMENTS

CH 673306 A5 * 2/1990

*Primary Examiner* — Glenn Myers
(74) *Attorney, Agent, or Firm* — James C. Nemmers; Shuttleworth & Ingersoll, PLC

(57) ABSTRACT

A method and cart for handling spacers used for spacing the wire mesh reinforcing cages used in the production of concrete pipe, The spacers are placed and shipped on hollow tubes laid in layers in a shipping container. The spacers are shipped to the user stored on these hollow tubes together with a mobile cart that has a vertical support containing a plurality of outwardly extending arms. When ready to be installed at the concrete pipe production site, a tube containing the spacers is removed from the shipping container and slipped over each arm. The cart can then easily be moved around the production location where the spacers for readily available for use in making the concrete product.

4 Claims, 4 Drawing Sheets

(56) References Cited

U.S. PATENT DOCUMENTS

| | | | |
|---|---|---|---|
| 1,089,290 A | 3/1914 | Thompson | |
| 1,306,297 A | 6/1919 | Auerochs | |
| 2,630,922 A * | 3/1953 | Hess | A47F 5/04 108/28 |
| 2,650,717 A * | 9/1953 | Larson | A47F 5/04 211/116 |
| 2,862,612 A * | 12/1958 | Brown | B65D 73/02 206/338 |
| 2,899,073 A * | 8/1959 | Brown | 211/70.6 |
| 3,310,180 A | 3/1967 | Neagle | |
| 3,585,775 A * | 6/1971 | Stenniken | 53/397 |
| 3,626,602 A | 12/1971 | Glowacki | |
| 3,798,788 A | 3/1974 | Kuntz | |
| 3,923,631 A * | 12/1975 | Palisin, Jr. | 204/297.06 |
| 4,282,976 A | 8/1981 | Fitzgerald | |
| 4,415,093 A * | 11/1983 | Livingston | 211/113 |
| 4,835,934 A | 6/1989 | Swenson | |
| 5,022,538 A * | 6/1991 | Richmond et al. | 211/113 |
| 5,188,241 A | 2/1993 | Kobza et al. | |
| D333,559 S | 3/1993 | Rowley | |
| D355,288 S | 2/1995 | Mallen | |
| 5,857,685 A | 1/1999 | Phillips et al. | |
| 5,906,277 A | 5/1999 | Vienneau | |
| 6,099,001 A | 8/2000 | Barresi | |
| 6,669,213 B2 | 12/2003 | Woerner | |
| 8,020,716 B2 | 9/2011 | Vitale | |
| 8,210,370 B2 | 7/2012 | Botkin | |
| 2005/0005564 A1 | 1/2005 | Bennett et al. | |

\* cited by examiner

METHOD FOR HANDLING SPACERS USED IN PRODUCING CONCRETE PIPE

This application is a divisional of U.S. patent application Ser. No. 12/721,898 filed Mar. 11, 2010, which claims priority under 35 USC 119 to Provisional Patent Application Ser. No. 61/241,245 filed on Sep. 10, 2009, the contents of both applications are hereby incorporated by reference.

BACKGROUND OF THE INVENTION

In producing large concrete products such as box sections, round pipes, culverts or manholes, reinforcement wire mesh cages are required to provide the necessary strength to the finished product. When these cages are placed in the forms, they must be spaced from each other and also spaced from the surfaces of the form used to produce the particular concrete product.

Commonly known spacers used for double cage reinforcement wire mesh cages for rectangular concrete products, such as box sections, have an eye at each end of a straight section. The eyes serve to space each of the cages from the surfaces of the product form. The straight piece between the eyes determines the spacing between the two reinforcement cages. For use with the double cage wire mesh cages for large round concrete products, another form of a suitable spacer has an eye on one end and a J-hook on the other end, the latter being hooked to one cage while the eye is hooked over a circumferential wire of the other cage. The eye of the spacer serves to space the cage from the form. The double cage spacer is typically constructed of spring steel and has a center straight section that joins U-shaped portions which determine the distance between the cages. Extending outwardly from the U-shaped portions are loops at the outer end of which are hooks that lock the spacer onto the circumferential wires of the cages. The loops extend outwardly from each of the cages to provide the spacing of the cages from the concrete forms.

Both of these spacers can be easily installed from outside of the double cage and do not require welding or other special attachment to the cages, thus speeding up the installation process and making it less costly to the producer of the concrete products. However, a large number of these spacers are required for each concrete product, and because they are not reused, they are commonly shipped to the user in a shipping container in large quantities. Because of the configuration of the spacers, when the user tries to remove one spacer from the container, they seem to be all hooked together. This tangling has been a big problem with spacers of this type, and valuable production time is wasted in untangling the spacers. Therefore, there is a need for an improved method of storing, shipping and dispensing these spacers.

SUMMARY OF THE INVENTION

The invention provides a method by which the spacers are packaged and shipped on hollow tubes placed in layers in a shipping container. This prevents tangling of the spacers while also making the shipment compact. The spacers are shipped to the user stored on these hollow tubes together with a mobile cart that has a vertical support containing a plurality of outwardly extending arms. When ready to be installed at the concrete pipe production site, a tube containing the spacers is removed from the shipping container and slipped over each arm. The cart can then easily be moved around the production location for use in making the concrete product.

DESCRIPTION OF THE PREFERRED EMBODIMENTS OF THE INVENTION

Figure 5:
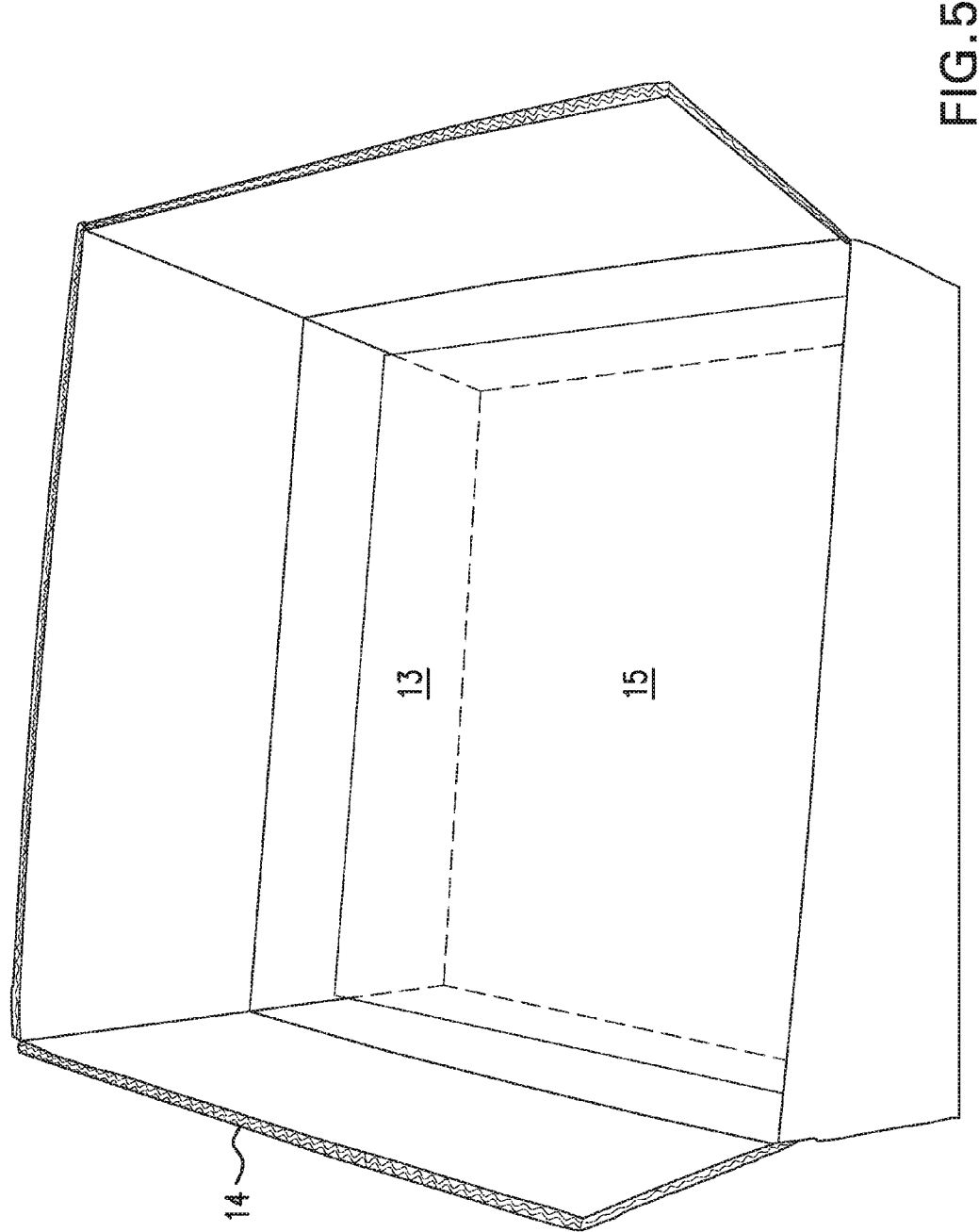
FIG. 5 is a perspective view of an open shipping container showing a barrier and a layer of tubes containing spacers which are represented only be a reference numeral.

The invention solves the spacer tangling problem by providing a method to package the spacers on tubes making them tangle free and much easier and quicker to use. As shown in the drawings, the spacers 10 are slid over hollow tubes 12 made of any suitable material such as cardboard, which can be recycled or otherwise disposed of. The tubes 12 containing the spacers 10 are then placed in a shipping box 14 the width of which is just slightly wider than the length of the tubes 12 so that the spacers will remain on the tubes 12 during shipping and until removed from the box 14. If desired, a barrier (FIG. 5 numeral 13) such as a piece of cardboard or heavy paper can be placed between layers of the tubes 12 containing the spacers 10. A layer of tubes 12 containing spacers 10 is represented in FIG. 5 by reference numeral 15.

Figure 1:
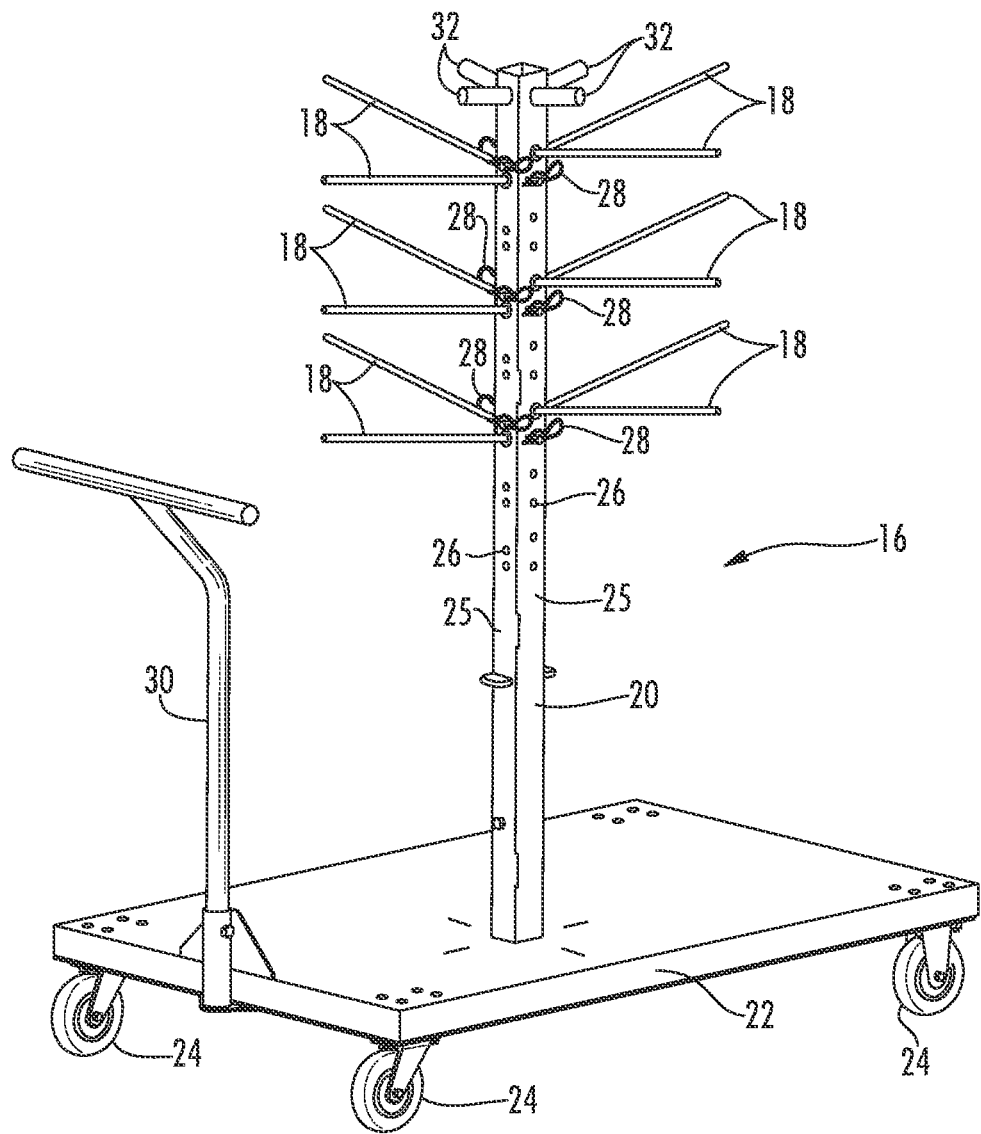
FIG. 1 is a perspective view of the cart for holding and carrying the spacers.
Figure 2:
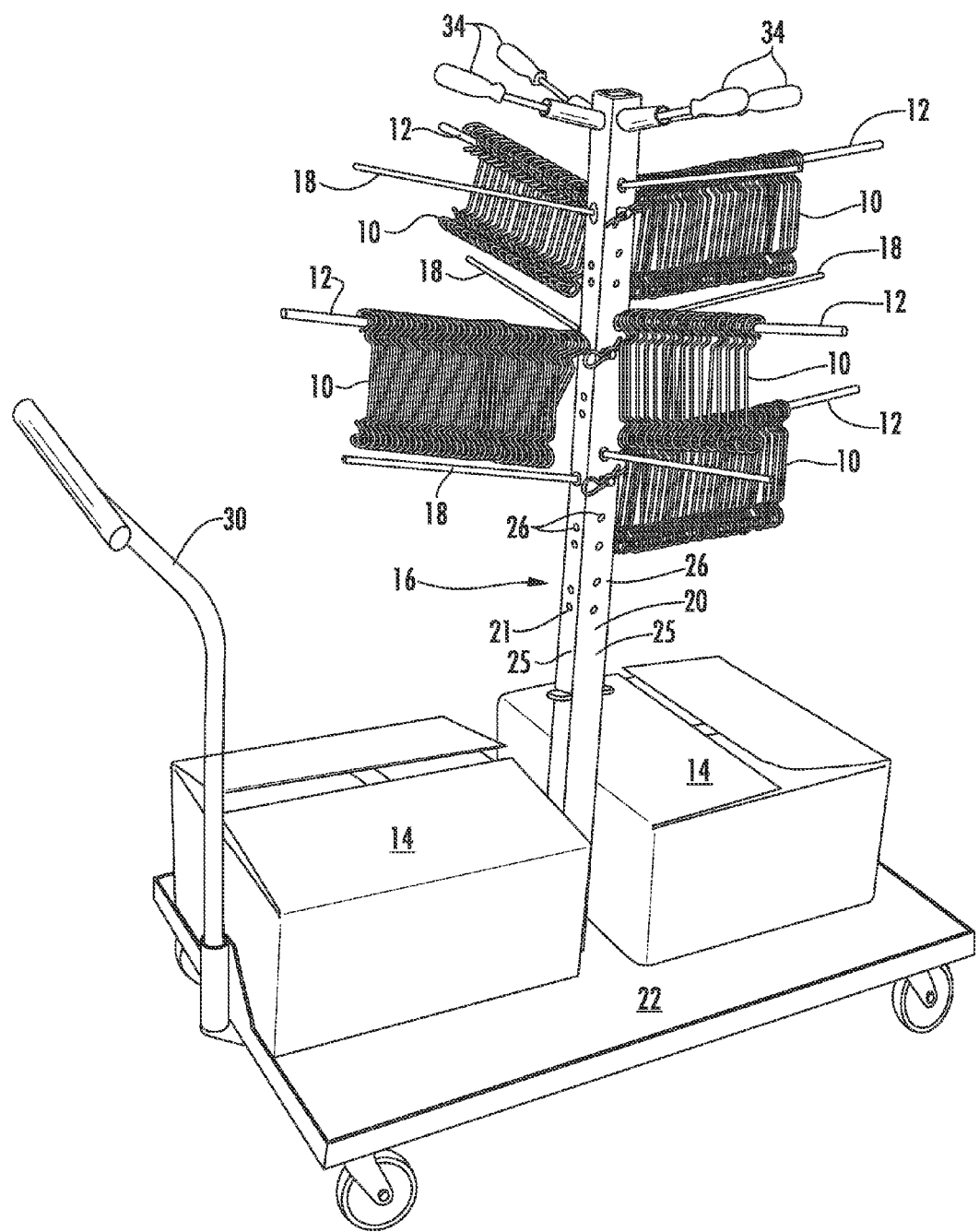
FIG. 2 is a perspective view of the cart with installation tools and the spacer-carrying tubes with spacers in place on the cart.
Figure 4:
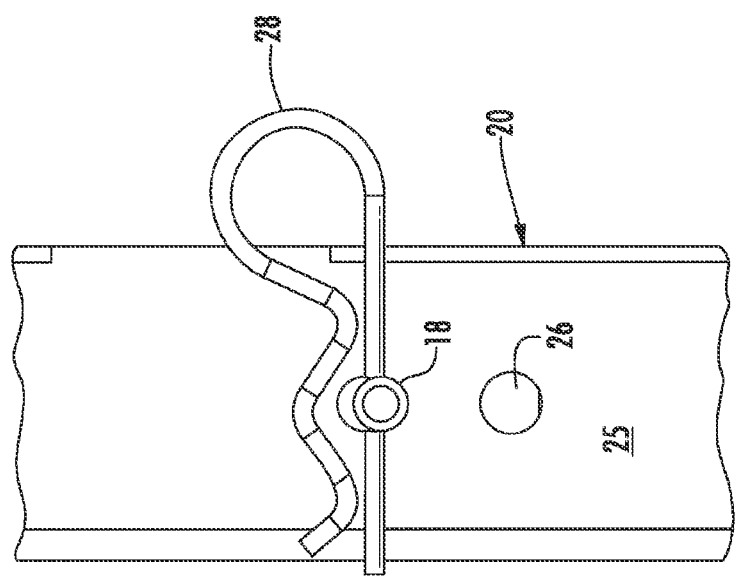
FIG. 4 is a side elevational view of another side of a portion of the cart's mast to further illustrate the hairpin locking an arm in place on the mast.
Figure 3:
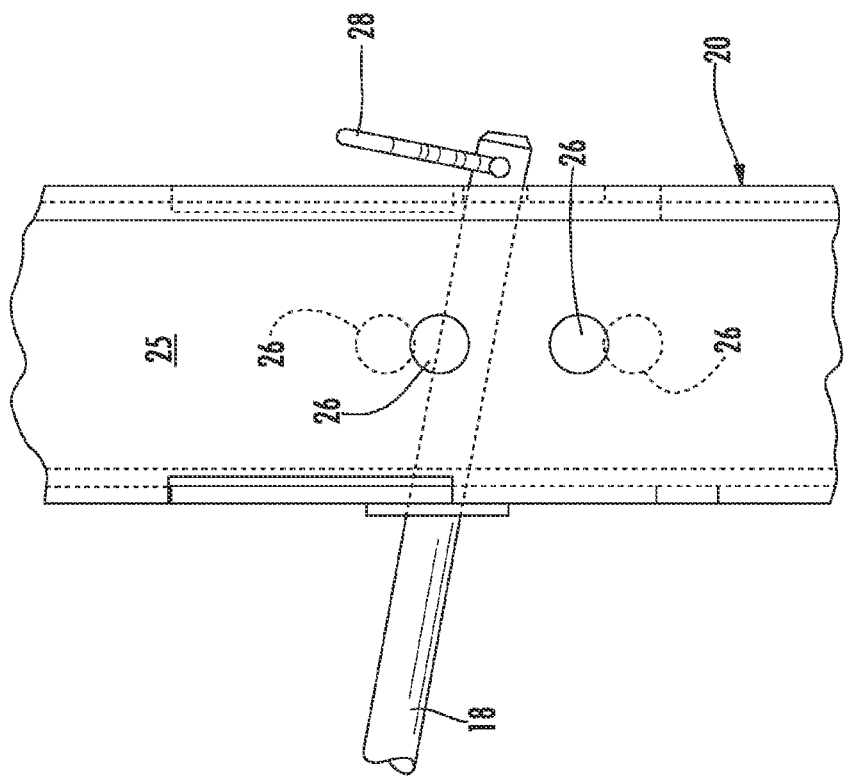
FIG. 3 is a side elevational view of one side of a portion of the cart's mast and showing one of the arms locked onto the mast with a hairpin.

When ready for use, a tube 12 containing multiple spacers 10 is removed from the shipping container 14 at the production site where each spacer 10 can be easily slipped off the tube 12 for use. In addition, the spacers 10 carried on the tubes 12 can be removed from the shipping container and then placed on a mobile cart 16 The cart 16 has a vertical support or mast 20 that is mounted in the center of a base 22 which can be rotated 360° by reason of being supported by wheels or casters 25. The base 22 is sufficiently large to provide for carrying one of more shipping containers 14. The mast 20 is preferably a hollow tube that is rectangular in cross section to provide four sides 25. Each side 25 of the mast 20 is provided with a plurality of holes 26 spaced vertically at predetermined intervals. As shown in FIG. 3, the spacing of the holes 26 is in pairs, and the spacing of the holes 26 on two opposite sides 25 is offset from the spacing on the other two opposing sides 25. A desired number of hanger rods or arms 18 extend outwardly from the mast 20. Each arm 18 is inserted into a hole 26 on one opposing side 25 and extends through the mast and through a corresponding hole 26 on the other opposing side 25 As shown, when an arm 18 is inserted into a hole 26, it is inserted on the higher one of a pair of holes 26 on one side 25 and then extends through the lower hole 26 of the corresponding pair on the opposing side 25. This provides for each arm 18 to extend outwardly and upwardly from the mast 20. As best seen in FIG. 2, after removal from the shipping container 14, the tubes 12 that hold the spacers 10 are then placed on a cart 16 by sliding the tubes 12 over arms 18. The slight upward angle of the arms 18 prevents the tubes 12 from inadvertently sliding off the arms 18.

The arms 18 are removably secured to the mast 20 by insertion of a removable pin, such as hairpin 28, into an opening in the end of the arm 18 after the arm 18 is in place on the mast 20. The arms 18 are thus adjustable to different heights to accommodate spacers 10 of different sizes. Adjustment of the height of arms 18 is accomplished by removing the hairpin 28 from an arm 18 and then removing the arm 18 and inserting the arm 18 into another hole 26 at the desired height. The base 22 can serve to carry multiple boxes of the spacers, and the base 22 is provided with a handle 30 to facilitate movement of the cart 16 from place to place.

At the upper end of the mast 20, a tool holding rod 32 extends outwardly from each side 25 of the mast 20. The specific design of the holding rods 32 depends upon the type of tool 34 to be held. As is well known to those skilled in the art, installation tools are necessary to install the spacers onto the reinforcement wire cages, and the holding rods 32 provide a convenient place to carry such tools.

The invention enables the spacers 10 to be easily packaged and shipped without tangling. At the production site, the user can place the shipping containers on the cart 16 and wheel the spacers to the worksite. This eliminates the necessity of the user making multiple trips back and forth to where the shipping containers are stored and then carrying heavy boxes to the area where the spacers are being installed. At the work site, the spacers 10 are hanging down, tangle free, for quick convenient removal. The cart 16 can also be used to accommodate and carry the spacer installation tools 34 so they are nearby and convenient for use. This invention is a great help in organizing the spacers for installation on the wire mesh reinforcing cages and thus saves considerable production time.

Having thus described the invention in connection with the preferred embodiments thereof, it will be evident to those skilled in the art that various revisions can be made to the preferred embodiments described herein without departing from the spirit and scope of the invention. It is my intention, however, that all such revisions and modifications that ere evident to those skilled in the art will be included within the scope of the following claims.

What is claimed is as follows:

1. A method for storing and handling spacers having an eye at one end of the spacer, the spacers being used for spacing wire mesh cages employed in the manufacture of large concrete products, said method comprising:
   providing a plurality of hollow tubes;
   sliding a plurality of said spacers onto each tube with the tube extending through the eye of each spacer;
   providing a moveable cart having a vertical support with a plurality of outwardly extending arms spaced apart vertically on the support;
   sliding the tubes containing said spacers onto the arms; and
   removing the spacers from the tubes as needed.

2. A method for storing and handling a plurality of spacers each having an eye at one end of the spacer that can become entangled with other spacers when they are stored or handled, the spacers being used for spacing wire mesh cages employed in the manufacture of large concrete products, said method comprising:
   providing a plurality of elongated, substantially straight members smaller in thickness than the eye of said spacers;
   sliding a plurality of said spacers onto each member with the member extending through the eye of each spacer; and
   placing the members containing said spacers in a shipping container the width of which is slightly wider that the length of the member so that the spacer will remain on the members until removed from the container.

3. The method of claim 2 in which the members containing the spacers are placed in the shipping container in layers, each layer being separated by a barrier.

4. The method of claim 3 in which the members containing the spacers are removed from the shipping container; and the spacers are removed from the members as needed.

* * * * *